May 24, 1966    A. H. SWAN    3,252,483
FLEXIBLE HOSE
Original Filed Aug. 9, 1960    2 Sheets-Sheet 1
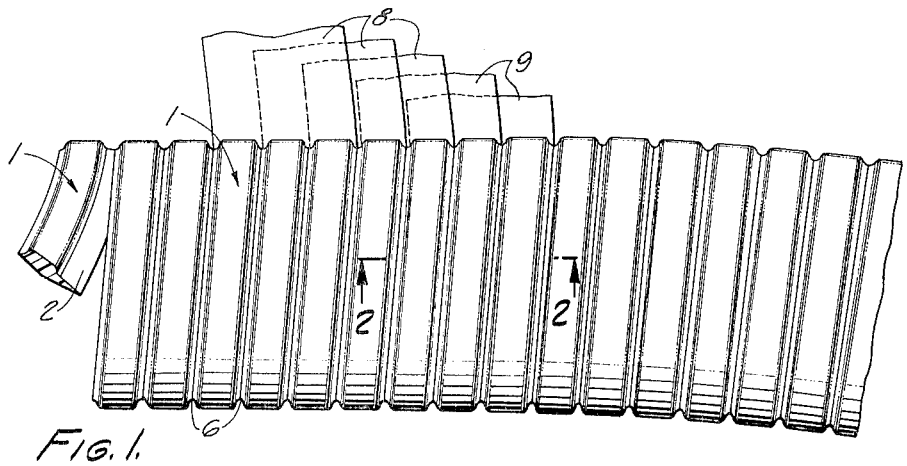
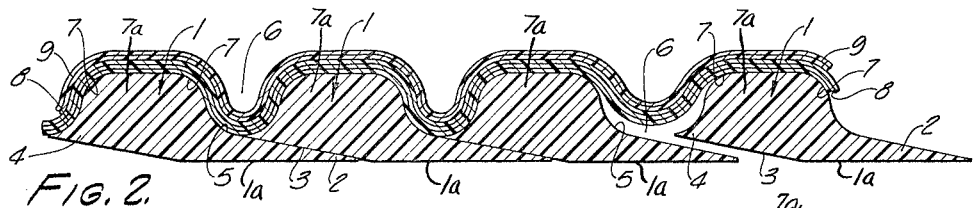
INVENTOR.
ALFRED H. SWAN
BY
ATTORNEYS

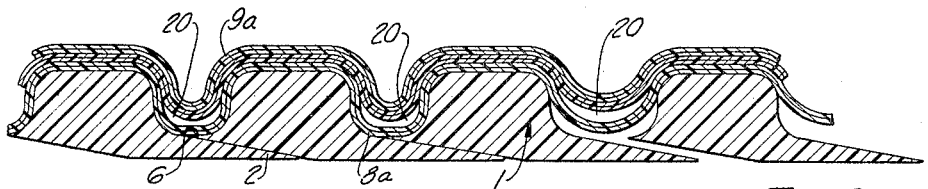
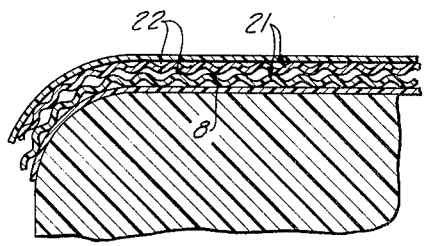
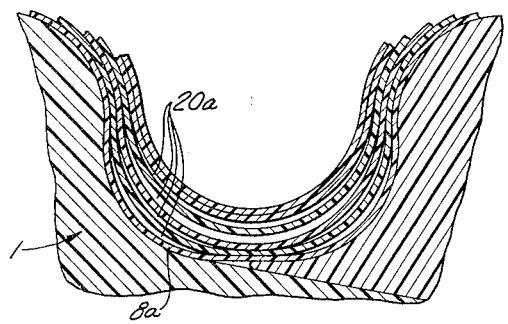
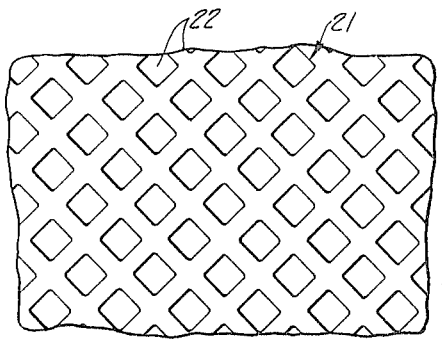

United States Patent Office 3,252,483
Patented May 24, 1966

3,252,483
FLEXIBLE HOSE
Alfred H. Swan, Newport Beach, Calif., assignor to Air Reduction Company, Incorporated, New York, N.Y., a corporation of New York
Continuation of application Ser. No. 48,476, Aug. 9, 1960. This application Nov. 26, 1963, Ser. No. 325,854
6 Claims. (Cl. 138—122)

This invention relates to flexible hose, more particularly to flexible hose formed of plastic materials and adapted to be used for vacuum service and is in continuation of my copending patent application Serial No. 48,476, filed August 9, 1960, for Flexible Hose, now abandoned.

Included in the objects of this invention are:

First, to provide a flexible hose which is arranged to flex primarily by expansion of its radially outer side rather than compression of its radially inner side so that when the interior of the hose is subjected to vacuum pressures axial shortening of the hose is minimized.

Second, to provide a flexible hose which offers a minimum of resistance to flow, for the reason that internal corrugations, undulations, or other turbulence-creating obstructions are minimized.

Third, to provide a flexible vacuum hose which avoids the use of metal reinforcement, yet which radially withstands the crushing loads imposed in service.

Fourth, to provide a flexible hose which utilizes a main body member, helical in form, with relatively cylindrical, radially inner and outer surfaces, and spacing means between the convolutions which resist axial compression, the body member being wrapped by flexible laminations which fold between the convolutions to permit limited separation for purposes of flexing the hose.

Fifth, to provide a flexible hose wherein the major portion thereof may be formed of plastic materials having a density below that of water, and provided with a wear-resistant cover of greater density but of insufficient volume per unit length of hose as not to impair the buoyancy of the hose.

With the above and other objects in view, as may appear hereinafter, reference is directed to the accompanying drawings in which:

FIGURE 1 is a fragmentary, side view of a flexible hose embodying one form of the invention with the laminations partially unwrapped;

FIGURE 2 is an enlarged, fragmentary sectional view thereof taken through 2—2 of FIGURE 1;

FIGURE 3 is a similar fragmentary, sectional view showing a modified form of the flexible hose;

FIGURE 4 is another fragmentary sectional view showing another modified form of the hose;

FIGURE 5 is a sectional view of the type of main body member utilized in the hose shown in FIGURES 1 and 2, but provided with a central void to decrease its average density;

FIGURE 6 is a similar sectional view of the main body member utilized in the hose construction shown in FIGURE 3, also with a void therein to reduce its average density;

FIGURE 7 is a fragmentary, sectional view similar to FIGURE 2, showing a further modified form of the flexible hose;

FIGURE 8 is an enlarged, fragmentary, sectional view similar to FIGURE 2 showing a modified form of the hose in which air spaces are formed;

FIGURE 9 is a further enlarged, fragmentary, sectional view similar to FIGURE 8 showing another arrangement of air space formed between the laminations or plies;

FIGURE 10 is a greatly enlarged, fragmentary, sectional view showing a further modified means of forming air spaces between the plies or laminations; wherein certain of the laminations provide pockets or an embossed pattern; and FIGURE 11 is an enlarged, fragmentary, plan view of one of the laminations, illustrating one type of embossed pattern which may be utilized in the construction shown in FIGURE 10.

Reference is first directed to FIGURES 1 and 2. The major portion of the flexible hose is formed by a main body member 1 in the form of a helical coil. The body member is basically rectangular in cross section with an axially directed fin 2 along one margin. The fin tapers axially and is adapted to extend axially under or radially inward within the adjacent convolution of the body member 1. To accommodate the fin 2, the axial side of the body member 1, opposite from the fin 2, is beveled as indicated by 3.

Radially outward from the beveled margin 3, the corresponding side of the main body member 1 is provided with a rudimentary lip 4, the radially outer side of which is curved. The radially outer side of the fin 2, at its juncture with the main body member 1, is also curved as indicated by 5, so that compositely these curved portions from the semicircular bottom of a channel 6 separating the convolutions of the main body member 1. The radially outer corners of the body member 1 are also curved as indicated by the rounded edges 7 of the rib-like protrusion 7a projecting outwardly along the outer face of the helical body member 1 opposite its flat inner bore-forming face 1a.

Wrapped about the main body member 1 is a set of inner laminations 8, each formed of a thin, flat strip having a width embracing at least two, and preferably three or more, of the convolutions of the main body member 1. In the structure illustrated, the inner lamination set 8 comprises three laminations. However, more or less laminations may be used. Wrapped about the inner lamination set 8 is an outer lamination set 9, which is shown as comprising two strips of laminations.

The main body member 1 and the inner set of laminations 8 are preferably formed of linear polyethylene which has a specific gravity less than water; for example, linear polyethylene having a specific gravity between .92 and .96. The outer lamination set 9 is preferably formed of a plastic having greater abrasive resistance than polyethylene; for example, one of the vinyl films which has a specific gravity between 1.25 and 1.4. It is also feasible to reduce the average density of the main body member 1 by providing a small void or hole 10 through the center thereof, as shown in FIGURE 5.

The convolutions of laminations or films fold into the channels 6 so that the hose is externally corrugated. Internally, the fins 2 and beveled margins 3 axially overlap so that a smooth bore is provided, as shown in FIGURE 2. The laminations folded into the channels 6 and the bearing contact between the fins 2 and beveled margins 3 prevent the convolutions of the main body member 1 from contracting axially beyond the configuration as shown in the left-hand portion of FIGURE 2. However, the portions of the laminations 8 and 9 folded into the channels 6 are capable of expanding axially, as shown in the right-hand portion of FIGURE 2, as the convolutions of the main body member 1 are separated.

Thus the hose construction is capable of being bent into a radius by the expansion of the radially outer side of the hose as shown in the right-hand portion of FIGURE 1. However, when the hose is subjected to an internal vacuum pressure, it cannot contract beyond the condition shown in the left-hand portion of FIGURE 2. For best utilization of the hose construction, the hose is employed so that the fluids flow from the left towards the right, as shown in FIGURES 1 and 2.

Reference is now directed to FIGURE 3. In this construction, the main body member 11 is also essentially rectangular in cross section and has a rib-like protrusion 7a projecting outwardly along its outer face opposite its flat inner bore-forming face 11a, but is provided with similar axially extending flanges 12 at opposite axial sides. The radially outer portions of these flanges are curved so that when the convolutions of the main body member 11 are in contact with each other by means of the flanges 12, an external helical channel 6 is formed, corresponding to the first described structure. Similar to the first described structure, the radially outer corners of the main body member 11 are curved as indicated by 7. If desired, a central hole 10 may be provided, as shown in FIGURE 6.

Reference is now directed to FIGURE 4. In this construction, the main body member 13 is also essentially rectangular in cross section and having an outwardly projecting rib 7a and a bore-forming face 13a, but is provided with a single axially directed flange 14 in place of the two flanges 12 of FIGURE 3. When the flange 14 of one convolution engages the body member of the adjacent convolution an annular channel 6, corresponding to the first described structure, is formed. Also the radially outer corners of ribs 7a are rounded as indicated by 7. In both the constructions shown in FIGURES 3 and 4, the main body members 11 and 13 are wrapped with the inner and outer lamination sets 8 and 9.

It should be noted that while it is preferred to form the laminations 8 and 9 by wrapping thin strips of film helically about the main body member, any one or all of these laminations may be in the form of sleeves drawn axially over the main body member. Also it should be noted that the main body members shown in FIGURES 2, 3, and 4, may be formed as extrusions or may be cut helically from a previously formed tube.

Reference is now directed to FIGURE 7. In this construction, a main body member 15 is provided which is more directly rectangular than the previously described body members. Each convolution of the main body member is separated by a spacer tube 16.

The spacer tube 16 is preferably wrapped within one margin of a cover strip 17 which is wrapped around the main body member 15 in such a manner that the convolutions overlap to provide a plurality of laminations 18. The cover strip 17 is so applied that the tube-enclosed margin constitutes the external margin and is forced between the convolutions of the main body member 15, and presses the underlying portion of the preceding convolutions of the cover strip 17 between the convolutions of the main body member 15 so that these portions underlie the spacer tube 16, as indicated by 19.

In the construction shown in FIGURE 7, the spacer tube 16 and inwardly folded portions of the cover strip 17 serve to space the convolutions of the main body member 15 to minimize axial compression. However, the convolutions of the main body member 15 may separate in the manner of the construction shown in FIGURES 1, 2, 3, and 4, so that the hose structure may be flexed.

Reference is now directed to the construction shown in FIGURE 8. This construction corresponds to the construction shown in FIGURES 1 and 2, and applies also to the constructions shown in FIGURES 3 and 4. In this construction the innermost lamination or group of laminations 8a is wrapped so as to fit closely to the contour of the main body member 1 to form a sealing layer, particularly around the walls of the channels 6. The subsequent plies or laminations 9a are wrapped so that they do not fold as deeply into the channels 6; thus creating air spaces 20 for the purpose of increasing the buoyancy of the hose.

A further modification of the arrangement shown in FIGURE 8 is indicated in FIGURE 9. In this construction the innermost ply or laminations 8a lay adjacent the surface of the main body member 1, particularly around the walls of the channels 6, and the subsequent plies or laminations are wrapped so that a series of spaces 20a are formed between the series of laminations.

A still further construction which tends to increase the buoyancy of the hose is shown in FIGURES 10 and 11. In this construction the innermost plies or laminations 8 may be of the nature shown in the first described structure, whereas intermediates plies 21 may be embossed with various patterns so that the plies when placed against each other form air spaces 22. These air spaces may be so arranged as to be isolated from each other, and minimize the possibility of water filling the air spaces should a leak develop in the underlying or overlying plies. By way of example, the intermediate embossed plies 21 may be embossed to form a waffle pattern, as indicated in FIGURE 11. However, any other embossed patterns are feasible in order to produce the desired air spaces.

It should be borne in mind that in all of the figures it is necessary to greatly exaggerate the thickness of the individual plies or laminations; and that where the drawings tend to indicate a single, continuous lamination, in fact each lamination may comprise several plies, particularly if they are formed by wrapping helical strips of material about the main body member as suggested in FIGURE 1.

While particular embodiments of this invention have been shown and described, it is not intended to limit the same to the exact details of the constructions set forth, and it embraces such changes, modifications, and equivalents of the parts of and their formation and arrangement as come within the purview of the appended claims.

What is claimed is:
1. A flexible hose, comprising:
  (a) a continuous strip of uniform transverse cross section along its length including a relatively thick rib and a relatively thin continuous marginal flange along at least one edge of said strip;
  (b) said strip being helically coiled with its convolutions in unattached separable abutment forming a continuous inner wall member to resist axial compression, said rib forming an outwardly projecting helical reinforcement resisting radial collapse;
  (c) said marginal flange being disposed so as to form the bottom of a relatively deep external helical channel between the convolutions of said rib;
  (d) and a pliable web helically wrapped about the length of the coiled inner wall member at essentially the same pitch as the convolutions of said inner wall member, said web having a width embracing at least two convolutions of said inner wall member, and said web including fold portions depressed into at least two convolutions of said channel when the hose is in its longitudinally compressed state to form, when wrapped, a multiple ply outer wall;
  (e) the convolutions of said inner wall member being separable from each other within the limits of extension of the folded portions of said outer wall to permit flexing of said flexible hose.

2. A flexible hose as set forth in claim 1, wherein:
  (a) marginal extensions are provided along both margins of said strip and form, when coiled, radially disposed abutting walls forming a positive stop limiting axial compression of the flexible hose.

3. A flexible hose as set forth in claim 1, wherein:
  (a) said web is covered by at least one additional web also embracing at least two convolutions of said inner wall and the channel formed thereby, said webs being disposed in axially offset relation.

4. A flexible hose as set forth in claim 3, wherein:
  (a) said webs are separated at least intermittently from each other to form voids therebetween.

5. A flexible, lightweight plastic hose comprising:
  (a) a strip of flexible plastic material flat on one face and having reinforcing rib means projecting outwardly on its opposite face and substantially parallel sides contiguous with said flat face;

(b) said strip being helically coiled such that said flat faces of the convolutions of said coiled strip are axially aligned and touching edgewise to form a substantially continuous uninterrupted uniform diameter bore and the confronting sides of the adjacent convolutions of said coiled strip are in separable edgewise engagement whereby said convoluted strip can be flexed or elongated by separation of said convolutions from each other but is constrained against axial compression by the edgewise abutment of said lateral sides;

(c) and flexible plastic joining means flexibly joining adjacent convolutions of said coiled strip to form an extensible connection therebetween.

6. A flexible, lightweight hose comprising:

(a) a continuous strip of flexible plastic material of uniform cross-section transverse thereof along its length, said strip having a flat inner face coextensive with the width of said strip, rib means having a substantial outward projection extending along the length of said strip at the outer face thereof, and substantially flat parallel sides along the lateral edges of said strip extending outwardly from said inner face;

(b) said strip being wound helically with its convolutions in unattached separable edgewise abutting relation to cause said flat inner face to form a continuous cylindrical bore with said rib means extending radially outward to resist radial compression, and such that said lateral sides of said strip form radially disposed surfaces projecting outwardly from said inner face and bear against the contiguous edges of adjacent convolutions of said strip to limit longitudinal shortening;

(c) and flexible joining means joining said rib in each convolution of said strip and at least one adjacent convolution of said strip;

(d) said flexible joining means extending helically along the joint formed by the said separable abutting convolutions of said strip and forming an axially extensible connection and a fluid-tight covering therebetween to allow limited axial separation of said convolutions from each other thereby to permit flexing of said hose.

References Cited by the Examiner
UNITED STATES PATENTS

| | | | |
|---|---|---|---|
| 848,238 | 3/1907 | Greenfield | 138—136 |
| 1,519,694 | 12/1924 | Muessman | 138—114 |
| 1,819,175 | 7/1931 | James | 138—122 |
| 2,266,227 | 12/1941 | Mall | 138—134 |
| 2,707,491 | 5/1955 | Harris et al. | 138—133 |
| 2,731,070 | 1/1956 | Meissner. | |
| 2,740,427 | 4/1956 | Swan | 138—122 |
| 2,874,723 | 2/1959 | Kahn. | |
| 3,047,026 | 7/1962 | Kahn | 138—122 |

FOREIGN PATENTS

| | | |
|---|---|---|
| 448,933 | 6/1936 | Great Britain. |
| 641,090 | 8/1950 | Great Britain. |
| 833,054 | 4/1960 | Great Britain. |

LAVERNE D. GEIGER, *Primary Examiner.*

LEWIS J. LENNY, *Examiner.*